United States Patent [19]

Fukatani

[11] Patent Number: 5,652,379

[45] Date of Patent: Jul. 29, 1997

[54] VEHICLE STATE OBSERVER SYSTEM

[75] Inventor: Katsumi Fukatani, Susono, Japan

[73] Assignee: Toyota Jidosha Kabushiki Kaisha, Aichi-ken, Japan

[21] Appl. No.: 572,733

[22] Filed: Dec. 14, 1995

[30] Foreign Application Priority Data

Oct. 26, 1995 [JP] Japan ..................... 7-010782

[51] Int. Cl.$^6$ ................................. G01M 15/00
[52] U.S. Cl. ........................ 73/116; 364/431.01
[58] Field of Search ..................... 73/116, 117.2, 73/117.3, 118.1, 118.2, 105; 123/436, 419; 364/431.01

[56] References Cited

U.S. PATENT DOCUMENTS

| | | | |
|---|---|---|---|
| 4,884,412 | 12/1989 | Sellers et al. | 62/115 |
| 5,200,899 | 4/1993 | Ribbens et al. | 73/116 |
| 5,339,245 | 8/1994 | Hirata et al. | 73/116 |
| 5,345,398 | 9/1994 | Lippmann et al. | 364/509 |
| 5,355,717 | 10/1994 | Tanaka et al. | 73/105 |
| 5,381,688 | 1/1995 | Ikeda et al. | 73/105 |
| 5,394,330 | 2/1995 | Homer | 73/116 |
| 5,471,870 | 12/1995 | Kuroda et al. | 73/116 |
| 5,481,906 | 1/1996 | Nagayoshi et al. | 73/116 |
| 5,495,415 | 2/1996 | Ribbens et al. | 73/116 |

FOREIGN PATENT DOCUMENTS 7-89304  4/1995  Japan.

OTHER PUBLICATIONS

Desoer and Kuh, *Basic Circuit Theory*, chapters 11–17, pp. 79–82. McGraw–Hill, 1967.
"Introduction to Modern Control Theory" written by Masatake Shiraishi and published by Keigaku Shuppan Co. on Nov. 25, 1987 (Japanese document).

*Primary Examiner*—Richard Chilcot
*Assistant Examiner*—George M. Dombroske
*Attorney, Agent, or Firm*—Oliff & Berridge

[57] ABSTRACT

A vehicle state observer system includes a state quantity measuring unit which measures an observable quantity of state of a vehicle. A controlled variable detecting unit detects a controlled variable of the vehicle. An observer estimates an unobservable quantity of state of the vehicle from the observable quantity measured by the state quantity measuring unit and the controlled variable detected by the controlled variable detecting unit, in accordance with a system matrix including a system variable. A system variable detecting unit detects the system variable included in the system matrix. A correcting unit corrects a pole of the observer in response to the system variable detected by the system variable detecting unit.

8 Claims, 7 Drawing Sheets

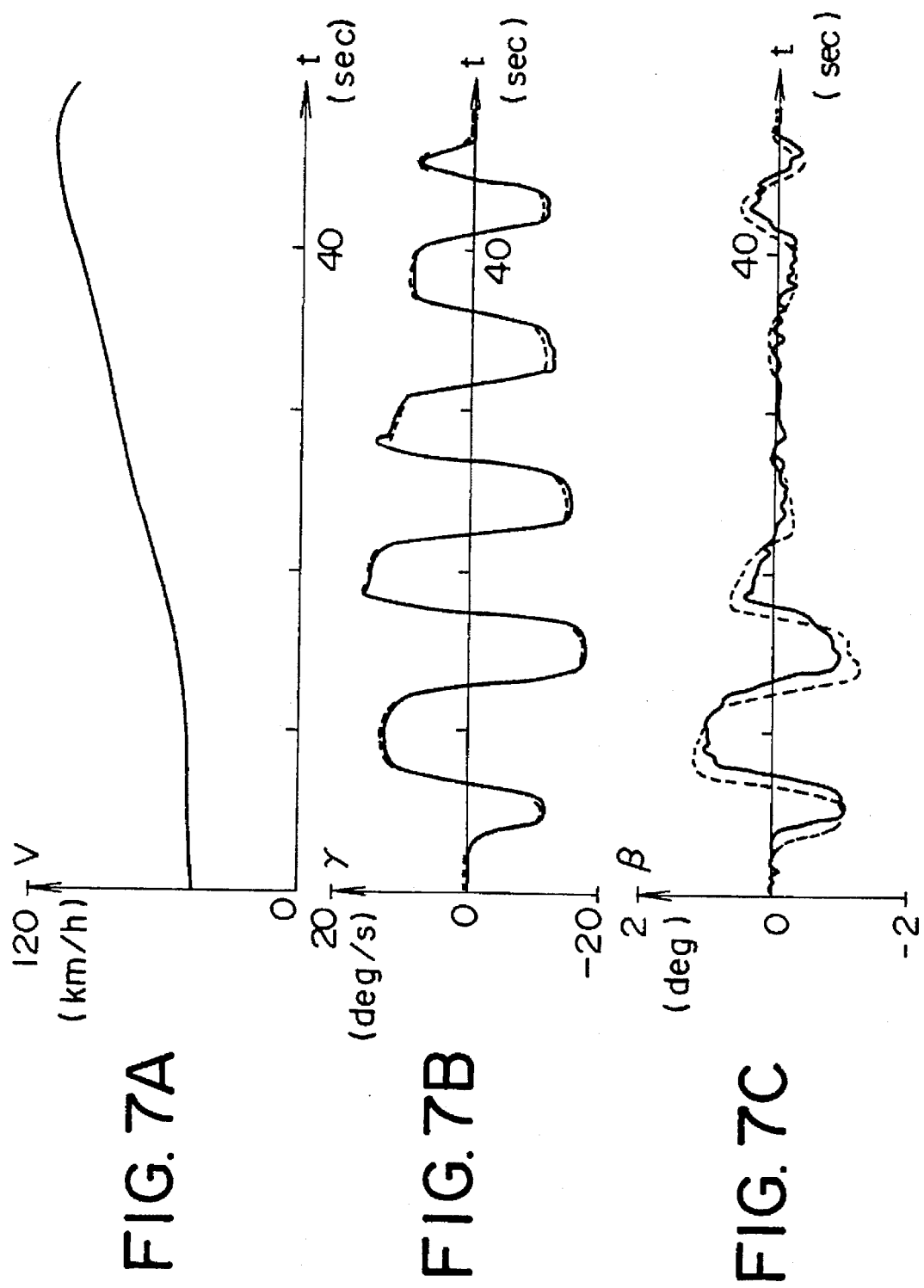

VEHICLE STATE OBSERVER SYSTEM

BACKGROUND OF THE INVENTION (1) Field of the Invention

The present invention relates to a vehicle state observer system which estimates a motion state of a vehicle.

(2) Description of the Related Art

A vehicle state observer system for use in an automotive vehicle is known. "Introduction to Modern Control Theory" by M. Shiraishi published on Nov. 25, 1987 from Keigaku Shuppan Co. in Japan teaches a vehicle state observer system which estimates a quantity of motion state of a vehicle.

The vehicle state observer system of the above type includes an observable state measuring unit which measures an observable quantity of state of a vehicle. A controlled variable detecting unit in the vehicle state observer system detects a controlled variable of the vehicle. An observer in the vehicle state observer system estimates an unobservable quantity of state of the vehicle from the measured observable quantity and from the detected controlled variable in accordance with a system matrix including a system variable.

The above vehicle state observer system estimates the quantities of state of the vehicle by maintaining a pole of the observer at a fixed point so as to optimize an error between the pole of the observer and a pole of a system.

Generally, a transfer function $G(s)$ of the system is represented by the equation: $G(s)=N(s)/D(s)$ where $s$ is a complex number, $N(s)$ is a numerator polynomial, and $D(s)$ is a denominator polynomial. The numerator polynomial $N(s)$ is indicative of the measured quantity, and the denominator polynomial $D(s)$ is indicative of the controlled variable. A transfer function $G'(s)$ of the observer is represented by the equation: $G'(s)=N'(s)/D'(s)$ where $s$ is a complex number, $N'(s)$ is a numerator polynomial, and $D'(s)$ is a denominator polynomial. The numerator polynomial $N'(s)$ is indicative of the observed quantity, and the denominator polynomial $D'(s)$ is indicative of the controlled variable.

The pole of the system mentioned above means a solution obtained by putting the denominator polynomial $D(s)$ of the transfer function of the system equal to zero. The pole of the observer mentioned above means a solution obtained by putting the denominator polynomial $D'(s)$ of the transfer function of the observer equal to zero.

If the pole of the observer is greater than the pole of the system, it is impossible to estimate the quantities of state of the vehicle. Therefore, in the conventional system, the pole of the observer is maintained at the fixed point which is smaller than the pole of the system.

However, the system variable which is included in the system matrix is changed, and the stability of the system is changed in accordance with the change of the system variable. The system variable is, for example, a vehicle speed, a vehicle weight, etc. Therefore, the pole of the system is changed in accordance with the change of the system variable. For example, when the system variable is changed, the system becomes more instable and the pole of the system becomes greater than before.

As described above, in the above vehicle state observer system, the pole of the observer is maintained at the fixed point. Thus, when the system variable is changed, the error between the pole of the observer and the pole of the system may be greater in accordance with the change of the system variable. If the error between the pole of the observer and the pole of the system is greater than a reference value, the accuracy of estimated quantities of state of the vehicle becomes low and the accuracy thereof may scatter.

Accordingly, the above vehicle state observer system may experience the scattering of the accuracy of estimated quantities of state of the vehicle when the system variable is changed.

In addition, a background technology of the vehicle state observer system of the present invention is disclosed in U.S. patent application Ser. No. 280,214, filed on Jul. 24, 1994 (corresponding to Japanese Laid-Open Patent Application No.7-89304), which has been assigned to the assignee of the present invention. The disclosure of the above application is incorporated by reference.

SUMMARY OF THE INVENTION

An object of the present invention is to provide an improved vehicle state observer system in which the above-described problem is eliminated.

Another object of the present invention is to provide a vehicle state observer system in which a transition of the pole of the observer follows a transition of the pole of the system, so that the error between the pole of the observer and the pole of the system is maintained to be constant even when the pole of the system is changed in response to the change of the system variable.

The above-mentioned objects of the present invention are achieved by a vehicle state observer system which includes a state quantity measuring unit which measures an observable quantity of state of a vehicle, a controlled variable detecting unit which detects a controlled variable of the vehicle, an observer which estimates an unobservable quantity of state of the vehicle from the observable quantity measured by the state quantity measuring unit and the controlled variable detected by the controlled variable detecting unit, based on a system matrix including a system variable, a system variable detecting unit which detects the system variable included in the system matrix, and a correcting unit which corrects a pole of the observer in response to the system variable detected by the system variable detecting unit.

According to the present invention, the system variable detecting unit detects a change of the system variable, and the correcting unit corrects the pole of the observer in accordance with the change of the system variable and makes it possible to prevent the scattering of the accuracy of estimated quantities of state of the vehicle even when the pole of the system is changed in response to the change of the system variable. Therefore, the vehicle state observer system of the present invention estimates the unobservable quantity of state of the vehicle with accuracy.

BRIEF DESCRIPTION OF THE DRAWINGS

The above and other objects, features and advantages of the present invention will be more apparent from the following detailed description when read in conjunction with the accompanying drawings in which:

FIGS. 7A, 7B and 7C are time charts for explaining an estimation result of the vehicle state observer system in the embodiment of the present invention.

DESCRIPTION OF THE PREFERRED EMBODIMENT

A description will now be given of a preferred embodiment of the present invention with reference to the accompanying drawings.

Figure 1:
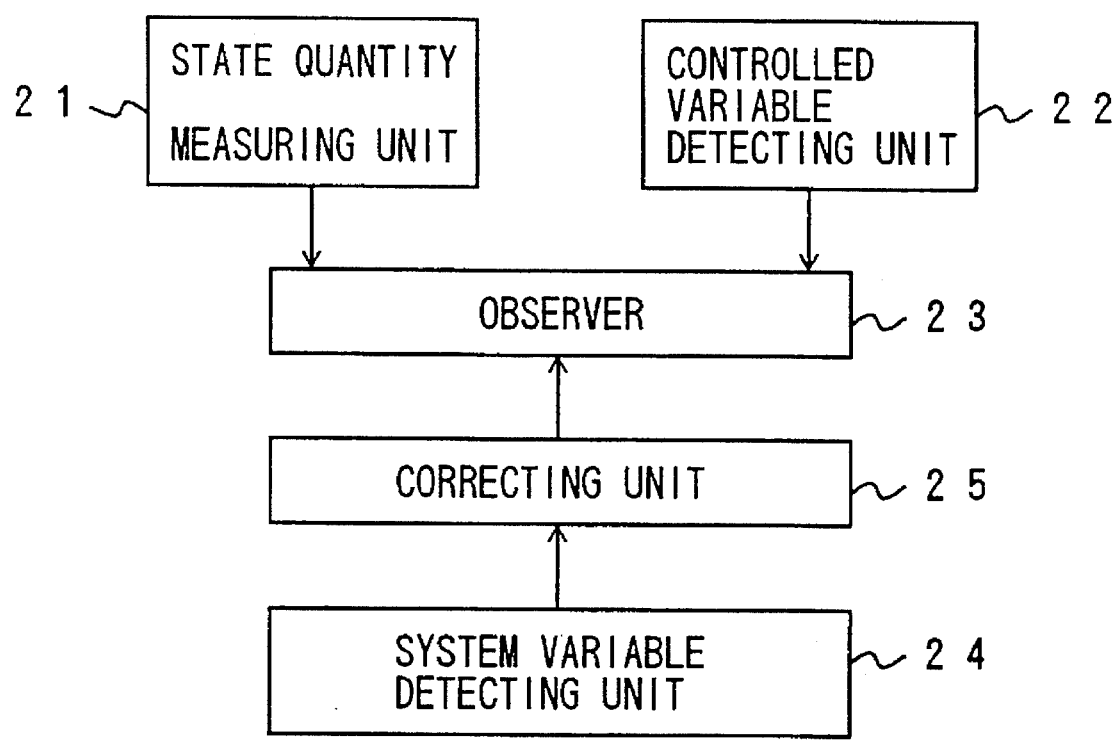
FIG. 1 is a block diagram of a vehicle state observer system in one embodiment of the present invention.

FIG. 1 shows a vehicle state observer system in one embodiment of the present invention.

Referring to FIG. 1, the vehicle state observer system includes a state quantity measuring unit 21 which measures an observable quantity of state of a vehicle. A controlled variable detecting unit 22 detects a controlled variable of the vehicle. An observer 23 estimates an unobservable quantity of state of the vehicle from the observable quantity measured by the state quantity measuring unit 21 and the controlled variable detected by the controlled variable detecting unit 22, in accordance with a system matrix including a system variable.

In the vehicle state observer system, shown in FIG. 1, a system variable detecting unit 24 detects the system variable included in the system matrix. A correcting unit 25 determines a corrected pole of the observer 23 in accordance with the system variable detected by the system variable detecting unit 24.

In the vehicle state observer system, shown in FIG. 1, the correcting unit 25 determines the corrected pole of the observer 23 in accordance with the system variable detected by the system variable detecting unit 24. Thus, the pole of the observer 23 is changed to the corrected pole determined by the correcting unit 25. With the corrected pole, the observer 23 estimates the unobservable quantity of state of the vehicle from the observable quantity measured by the state quantity measuring unit 21 and the controlled variable detected by the controlled variable detecting unit 22, in accordance with the system matrix.

Accordingly, the vehicle state observer system of the present invention allows a transition of the pole of the observer to follow a transition of the pole of the system, thereby maintaining the error between the pole of the observer and the pole of the system to be constant even when the pole of the system is changed in accordance with the change of the system variable. Therefore, the vehicle state observer system of the present invention can prevent the scattering of the accuracy of estimated quantities of state of the vehicle even when the pole of the system is changed in accordance with the change of the system variable.

Hereinafter, a yaw rate $\Gamma$ and a lateral slip angle $\beta$ are taken as quantities of state of a vehicle. A system in which rear wheels of the vehicle are manipulated to control the quantities of state of the vehicle will be considered. For the purpose of consideration, a vehicle model which is represented with two degrees of freedom is taken as a controlled system.

Taking into account a known equation of motion of the vehicle model, the yaw rate $\Gamma$, the lateral slip angle $\beta$, a vehicle speed V, a front-wheel steering angle $\delta f$, and a rear-wheel steering angle $\delta r$ are variables of the vehicle model which are defined by the following equations.

$$dx/dt = Ax + Bu \tag{1}$$

$$x = \begin{bmatrix} \beta \\ \Gamma \end{bmatrix} \tag{2}$$

$$u = \begin{bmatrix} \delta f \\ \delta r \end{bmatrix} \tag{3}$$

$$A \begin{bmatrix} -(cf+cr)/M \cdot V & -1-(af \cdot cf - ar \cdot cr)/M \cdot V^2 \\ -(af \cdot cf - ar \cdot cr)/Iz & -(af^2 \cdot cf + ar^2 \cdot cr)/Iz \cdot V^2 \end{bmatrix} \tag{4}$$

$$B = \begin{bmatrix} cf/M \cdot V & cr/M \cdot V \\ af \cdot cf/Iz & -ar \cdot cr/Iz \end{bmatrix} \tag{5}$$

In the above Equation (1), x is a state vector, u is a control vector, A is a system matrix, and B is a control matrix.

In the above formulas (4) and (5):

M is a mass of the vehicle;

Iz is a yaw moment of inertia of the vehicle;

af is a horizontal distance from the center of gravity of the vehicle to a front axle;

ar is a horizontal distance from the center of gravity of the vehicle to a rear axle;

cf is a cornering power of the front wheels; and cr is a cornering power of the rear wheels. The vehicle parameters in the above formulas (4) and (5) are determined with respect to individual vehicles, and they are considered constant values.

Next, a description will be given of an observer which estimates a lateral slip angle $\beta$.

As described above, the relationship between the yaw rate $\Gamma$, the lateral slip angle $\beta$, the vehicle speed V, the front-wheel steering angle $\delta f$ and the rear-wheel steering angle $\delta r$ is defined as in the above Equations (1) through (5).

Generally, the yaw rate $\Gamma$ can be easily measured by using a yaw rate sensor. Thus, the yaw rate $\Gamma$ is an observable state of the vehicle which is sensed by the yaw rate sensor. However, it is difficult to detect the lateral slip angle $\beta$. Thus, it is assumed that the lateral slip angle $\beta$ is an unobservable state of the vehicle which is estimated by the observer.

Supposing that the observer estimates a lateral slip angle $\beta$ from a reference input of the yaw rate $\Gamma$, an output equation of the observer is defined by $$y = Cx \tag{6}$$

$$C = [0\ 1] \tag{7}$$

In the above formulas (6) and (7), y is an output vector and C is an output matrix.

Figure 3:
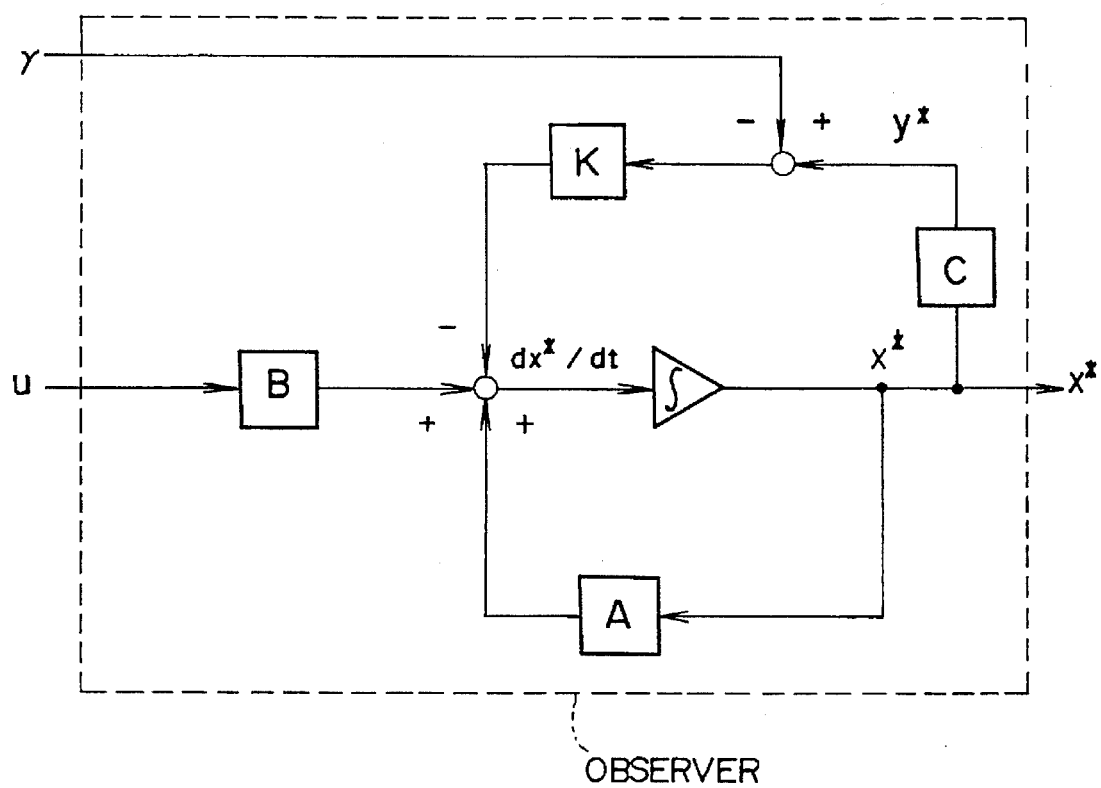
FIG. 3 is a block diagram of an observer provided in connection with a vehicle model.

FIG. 3 shows an observer which is provided in correspondence to the vehicle model defined by the above Equations (1)–(7). This observer is of the same degree as the above vehicle model.

A state equation of the observer shown in FIG. 3 is as follows.

$$\begin{aligned} dx^*/dt &= (A - KC)x^* + Ky + Bu \\ &= Ax^* + Bu - KC(x^* - x) \end{aligned} \tag{8}$$

where $x^*$ is an estimated value of the state vector x, $dx^*/dt$ is a derivative of the estimated value $x^*$, and K is a feedback gain of the observer.

As shown in FIG. 3, the observer inputs the measured yaw rate $\Gamma$ and the detected control vector u, and generates an estimated value $x^*$ of the state vector x from these inputs based on the state equation defined by the above Equation (8).

More specifically, the observer defined by the above Equation (8) generates an estimated lateral slip angle β* and an estimated yaw rate Γ* from the measured yaw rate Γ from the yaw rate sensor, the detected front-wheel steering angle δf from a front-wheel steering angle sensor, and the detected rear-wheel steering angle δr from a rear-wheel steering angle sensor. In the present embodiment, the front-wheel steering angle δf and the rear-wheel steering angle δr are taken as the controlled variables.

A transfer function G'(s) of the observer is represented by the equation: G'(s)=N'(s)/D'(s) where s is a complex number, N'(s) is a numerator polynomial (which is indicative of the observed quantity), and D'(s) is a denominator polynomial (which is indicative of the controlled variable).

A pole of the observer defined by the above Equation (8) means a solution obtained by putting the denominator polynomial D'(s) of the transfer function of the observer equal to zero. The solution, which is the pole of the observer, is equivalent to an eigenvalue of the matrix (A−KC).

Figure 4:
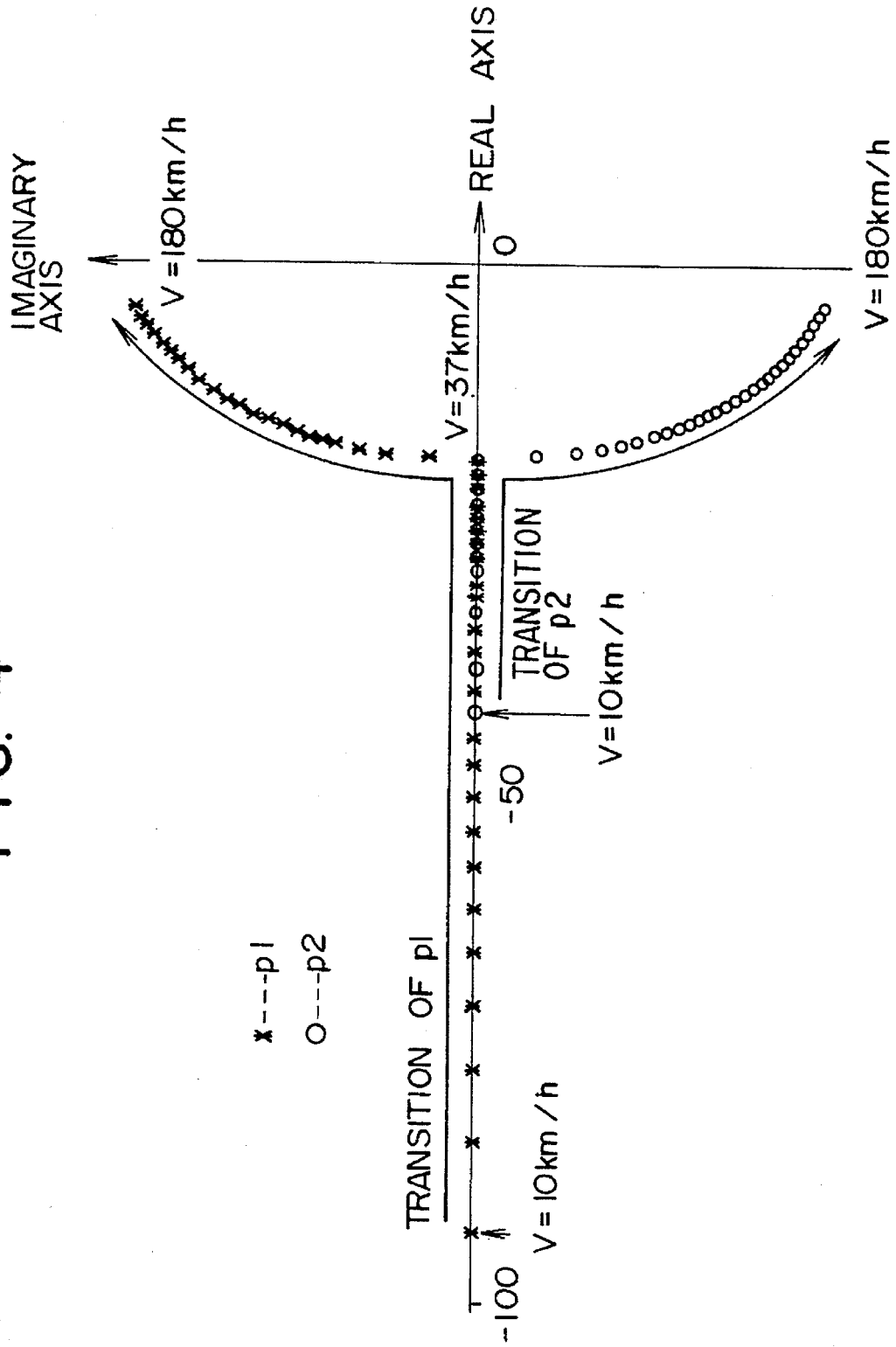
FIG. 4 is a chart for explaining a transition of a pole of a system in accordance with a change in a system variable.

FIG. 4 shows a transition of the pole of the system (or the vehicle model) in accordance with a change of the system variable (or the vehicle speed V) on a complex plane.

In the present embodiment, a vehicle speed V sensed by a vehicle speed sensor is taken as the system variable. The vehicle speed V is one of the system variables which are included in the system matrix A.

The system matrix A defined by the above formula (4) includes the vehicle speed V as the system variable. As the vehicle speed V varies, the element included in the system matrix A varies accordingly.

Generally, a transfer function G(s) of the system is represented by the equation: G(s)=N(s)/D(s) where s is a complex number, N(s) is a numerator polynomial (which is indicative of the measured quantity), and D(s) is a denominator polynomial (which is indicative of the controlled variable).

A pole of the system is a solution obtained by putting the denominator polynomial D(s) of the transfer function of the system equal to zero. The solution, or the pole of the system, is equivalent to an eigenvalue of the system matrix A.

Accordingly, when the system variable (or the vehicle speed V) included in the system matrix A varies, the eigenvalue of the system matrix A is changed. Hence, the pole of the system is changed in accordance with the change of the vehicle speed V.

The system matrix A in the present embodiment is a 2×2 square matrix as indicated by the above formula (4). There are two eigenvalues of the system matrix A. Hence, there are two poles "p1" and "p2" of the system in the present embodiment. As shown in FIG. 4, and the poles p1 and p2 of the system are plotted with "*" and "o" respectively in accordance with the increase of the vehicle speed V from 10 km/h to 180 km/h.

The transition of each of the poles p1 and p2 of the system in accordance with the change of the vehicle speed V is indicated by the arrow in FIG. 4. Generally, the stability of the vehicle is reduced as the vehicle speed is increased. In the left half of the complex plane in FIG. 4, the real part of each of the poles p1 and p2 of the system approaches zero (which is the origin of the complex plane) in accordance with the increase of the vehicle speed V. The real part of each of the poles p1 and p2 of the system becomes greater in accordance with the increase of the vehicle speed V.

Figure 5:
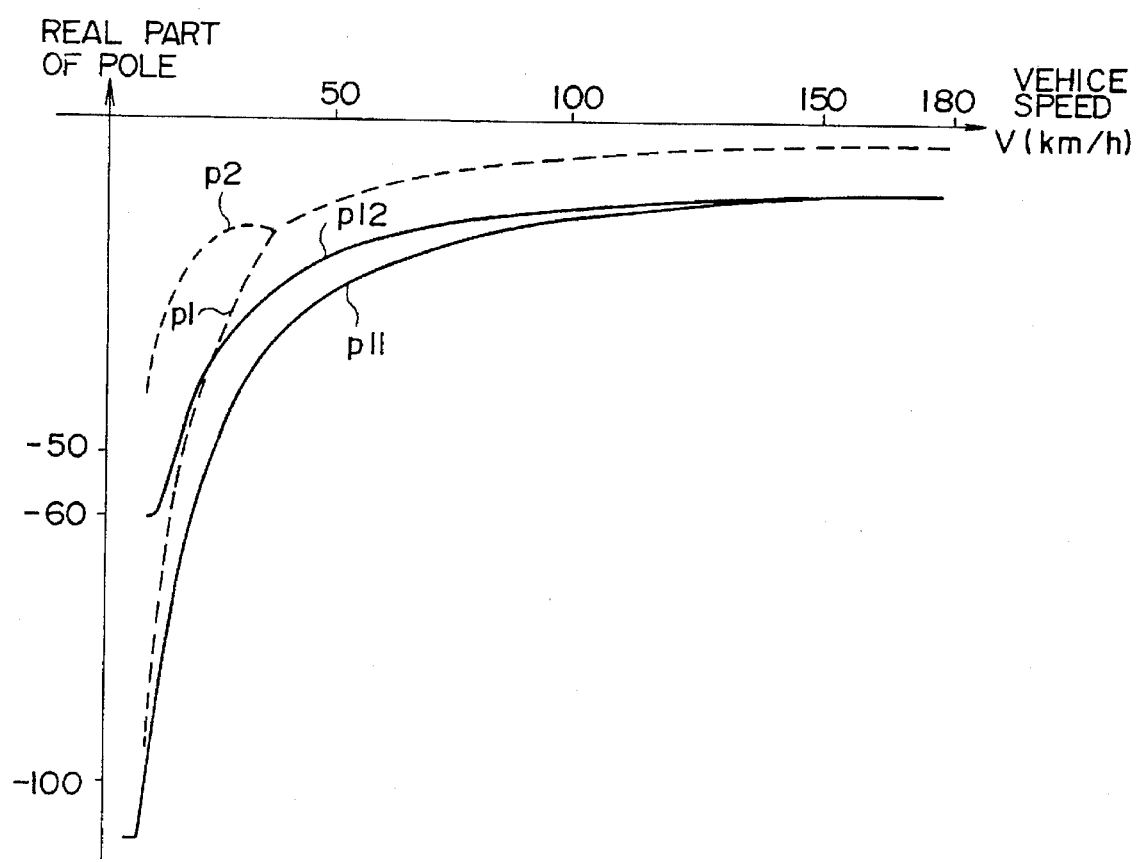
FIG. 5 is a chart for explaining a relationship between the vehicle speed and the real part of the pole of the system.

FIG. 5 shows a relationship between the vehicle speed and the real part of the pole of the system. In FIG. 5, a transition of each of the real parts of the poles p1 and p2 of the system in accordance with the increase of the vehicle speed V is indicated by a dotted line. It is observed that the real parts of the poles p1 and p2 of the system are increased in accordance with the increase of the vehicle speed V.

In the present embodiment, when the vehicle speed V is below 37 km/h (low speed range), the two poles p1 and p2 of the system are indicated as two distinct real numbers (FIG. 4). So there are two real parts of the poles of the system for a value of the vehicle speed V when the vehicle speed V is in the low speed range.

In the present embodiment, when the vehicle speed V is above 37 km/h (high speed range), the two poles p1 and p2 of the system are indicated as two conjugate complex numbers (FIG. 4). So there is one real part of the poles of the system for a value of the vehicle speed V when the vehicle speed V is in the high speed range.

The transition of each of the poles p1 and p2 of the system in accordance with the increase of the vehicle speed V, as indicated by the dotted line in FIG. 5, is predetermined by calculating the eigenvalues of the system matrix A in accordance with the increase of the vehicle speed V.

In the present embodiment, the observer includes two poles p11 and p12 which are defined as a function of the vehicle speed V. The poles of the observer are corrected such that the transition of each of the poles p11 and p12 of the observer follows the transition of the poles p1 and p2 of the system in accordance with a change of the vehicle speed V. The definition of each of the poles p11 and p12 of the observer in the present embodiment is as follows.

$$p11 = -5.0 - 1080/V \quad (-100 \leq p11) \tag{9}$$

$$p12 = -7.0 - 720/V \quad (-60 \leq p12) \tag{10}$$

In the present embodiment, the feedback gain K of the observer is controlled so that the poles p11 and p12 vary in accordance with the change of the vehicle speed V as defined by the above Equations (9) and (10).

The feedback gain K of the observer is defined with variables k11 and k12, as follows.

$$K = \begin{bmatrix} k11 \\ k12 \end{bmatrix} \tag{11}$$

The poles p11 and p12 of the observer in the present embodiment are corrected in accordance with the functions defined by the above Equations (9) and (10). Thus, the transition of each of the poles p11 and p12 of the observer in accordance with the increase of the vehicle speed V is indicated by a solid line in FIG. 5. In the present embodiment, as shown in FIG. 5, the transition of the poles p11 and p12 of the observer follows the transition of the poles p1 and p2 of the system, respectively.

Accordingly, the observer in the present embodiment generates an estimated lateral slip angle β* and an estimated yaw rate Γ* from the measured yaw rate Γ, the detected front-wheel steering angle δf and the detected rear-wheel steering angle δr in accordance with the above Equation (8), based on a corrected pole of the observer obtained by the above Equations (9) and (10).

Figure 6A:
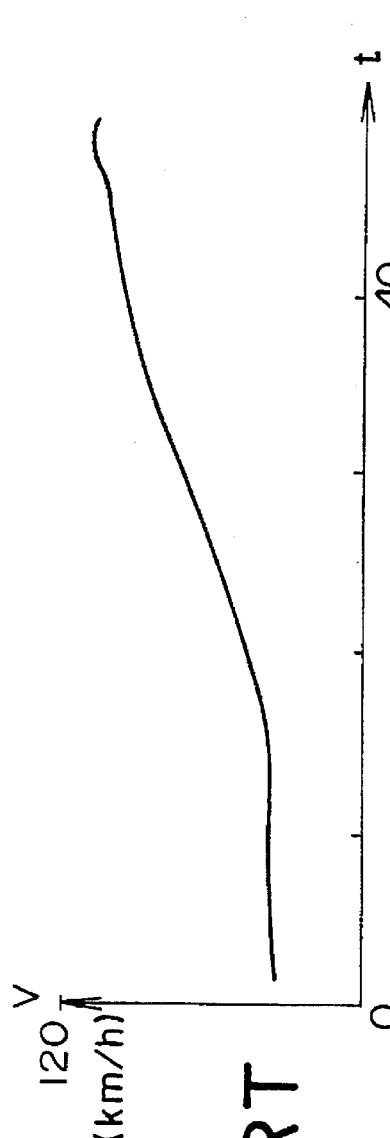
FIGS. 6A, 6B and 6C are time charts for explaining an estimation result of a conventional vehicle state observer system.
Figure 6B:
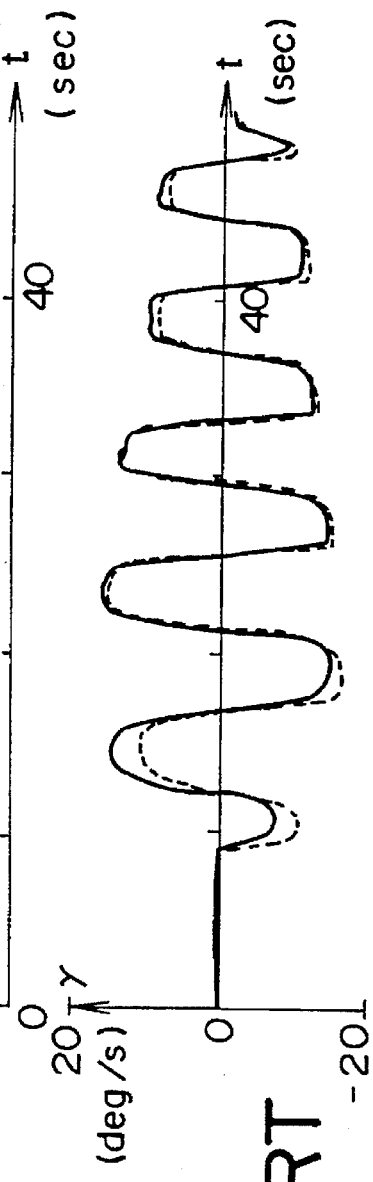
Figure 6C:

FIGS. 6A, 6B and 6C shows an estimation result of a conventional vehicle state observer system.

FIG. 6A is a time chart indicating a relationship between time t and vehicle speed V when an experiment is performed with the conventional system.

In FIG. 6B, an error between an estimated yaw rate (indicated by a dotted line) from the pole-fixed observer of the conventional system and a measured yaw rate (indicated by a solid line) from a yaw rate measuring instrument is shown.

In FIG. 6C, an error between an estimated lateral slip angle (indicated by a dotted line) from the pole-fixed observer of the conventional system and a measured lateral slip angle (indicated by a solid line) from a lateral slip angle measuring instrument is shown.

During the experiment, the poles p11 and p12 of the observer in the conventional system are maintained at a fixed point (=−20.0).

In the case of the conventional system, as shown in FIGS. 6B and 6C, the error between the estimated yaw rate and the measured yaw rate and the error between the estimated lateral slip angle and the measured lateral slip angle are relatively large. It is found that the accuracy of the estimation by the pole-fixed observer disperses according to the vehicle speed V.

In the case of the conventional system, the accuracy of the estimated yaw rate is highest when the vehicle speed V is around 50 km/h, and the accuracy of the estimated lateral slip angle is relatively high throughout the whole range of the vehicle speed V since the poles of the observer are preset at a suitable fixed point.

It is found that when the vehicle speed V is low, the error between the pole of the system and the pole of the observer becomes too small, so that the difference between the estimated yaw rate and the measured value is relatively great. It is found that when the vehicle speed V is high, the error between the pole of the system and the pole of the observer becomes too great, so that the difference between the estimated yaw rate and the measured value is relatively great.

In the case of the conventional system, the poles of the observer are preset such that the accuracy of the estimated lateral slip angle is relatively high. However, it is found that the difference between the estimated lateral slip angle and the measured value is relatively great when the vehicle speed V is high.

FIGS. 7A, 7B and 7C shows an estimation result of the vehicle state observer system in the present embodiment by comparison with the estimation result of FIGS. 6A, 6B and 6C.

FIG. 7A is a time chart indicating a relationship between time t and vehicle speed V when an experiment is performed with the vehicle state observer system in the present embodiment.

In FIG. 7B, an error between an estimated yaw rate (indicated by a dotted line) from the observer of the present embodiment and a measured yaw rate (indicated by a solid line) from the yaw rate measuring instrument is shown.

In FIG. 7C, an error between an estimated lateral slip angle (indicated by a dotted line) from the observer of the present embodiment and a measured lateral slip angle (indicated by a solid line) from the lateral slip angle measuring instrument is shown.

Before the measured lateral slip angle is obtained from the lateral slip angle measuring instrument, noise is eliminated by passing the output of the instrument through a low pass filter during the above experiment. For this reason, there is a slight time lag between the phase of the measured lateral slip angle and the phase of the estimated lateral slip angle in FIG. 7C.

The poles p11 and p12 of the observer in the present embodiment are defined by the above Equations (9) and (10) as a function of the vehicle speed V, allowing the transition of the poles p11 and p12 of the observer to follow the transition of the poles p1 and p2 of the system. It is found that, when the vehicle speed is increased, the error between the estimated yaw rate and the measured value and the error between the estimated lateral slip angle and the measured value are negligible, as shown in FIGS. 7B and 7C.

The lateral slip angle measuring instrument utilizes a Doppler sensor which senses a vehicle speed in the aft-and-fore direction and a vehicle speed in the right-and-left direction. By using the lateral slip angle measuring instrument, an angle of a vector sum of the sensed vehicle speeds to the aft-and-fore direction is determined.

Figure 2:
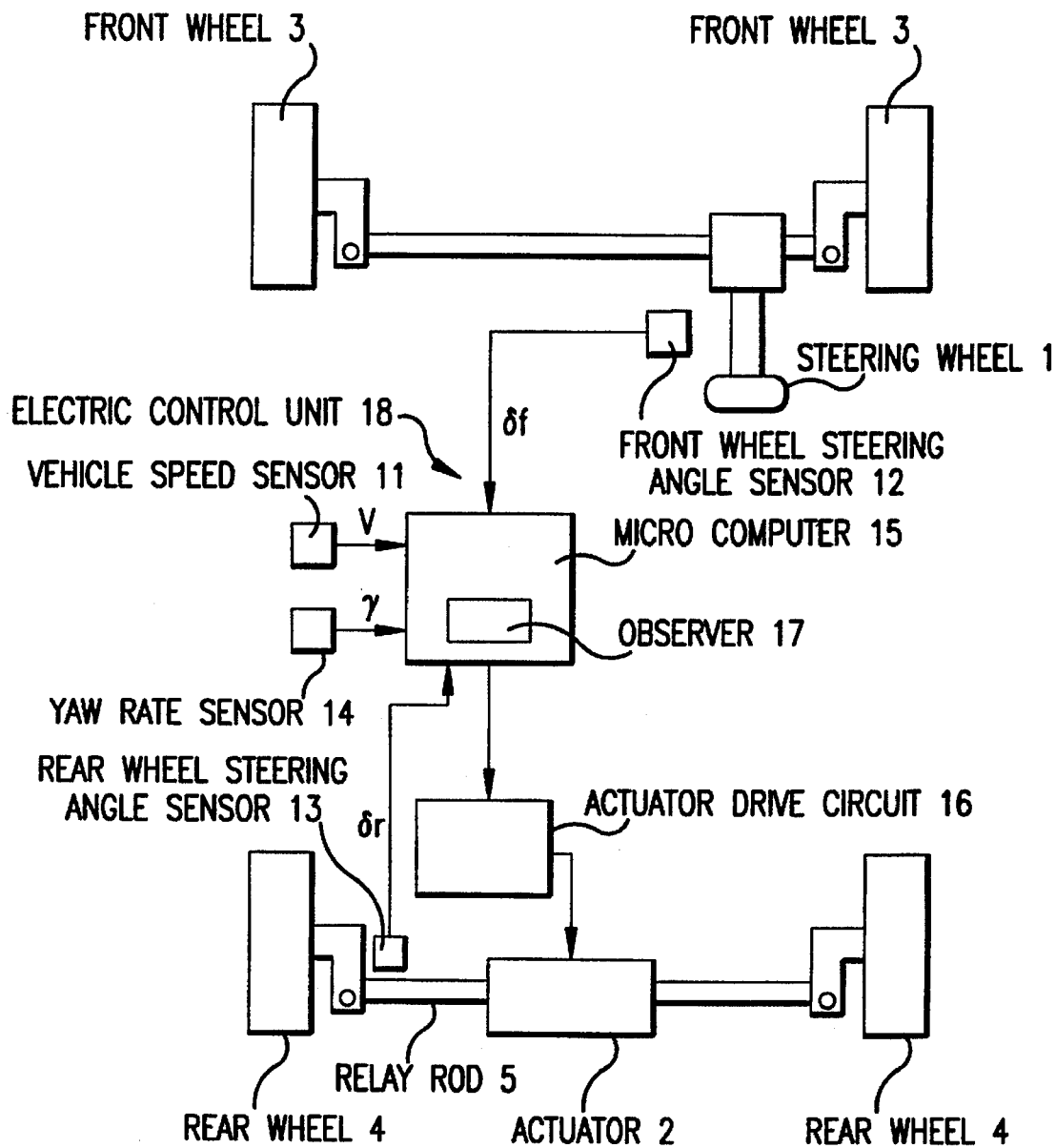
FIG. 2 is a diagram of a four-wheel steering system of a vehicle to which the embodiment of the present invention is applied.

FIG. 2 shows a four-wheel steering system to which the embodiment of the present invention is applied.

The four-wheel steering system, shown in FIG. 2, controls the steering of the rear wheels in accordance with an estimated quantity of state of the vehicle from the vehicle state observer system including the observer in the present embodiment. In the present embodiment, the two poles p11 and p12 of the observer are defined by the above Equations (9) and (10) as a function of the vehicle speed V.

In the four-wheel steering system shown in FIG. 2, a controlled quantity to manipulate the rear wheels of the vehicle is determined in accordance with an estimated quantity of state of the vehicle from the vehicle state observer system of the present invention.

The four-wheel steering system shown in FIG. 2 includes a steering wheel 1 which is used by a vehicle operator to steer front wheels 3 of a vehicle, and an actuator 2 which is used to steer rear wheels 4 of the vehicle. A rear wheel steering mechanism is formed by the actuator 2 and a relay rod 5, the relay rod 5 being linked to the rear wheels 4 to allow the steering of the rear wheels 4. The actuator 2 actuates the relay rod 5 in an axial direction of the relay rod 5 so that the steering of the rear wheels 4 is controlled by the actuator 2.

The four-wheel steering system further includes an electric control unit 18 which controls the actuator 2. The electric control unit 18 is provided within the vehicle on which the four-wheel steering system is mounted.

The electric control unit 18 includes a vehicle speed sensor 11 which senses the vehicle speed V, a front-wheel steering angle sensor 12 which senses the front-wheel steering angle δf, a rear-wheel steering angle sensor 13 which senses the rear-wheel steering angle δr, and a yaw rate sensor 14 which senses the yaw rate Γ. The yaw rate Γ which is an observable quantity of state of the vehicle is sensed by the yaw rate sensor 14.

Outputs of the above-described sensors 11, 12, 13 and 14 are connected to respective inputs of a microcomputer 15.

An observer 17 including the two poles p11 and p12 defined by the above Equations (9) and (10) is provided in the microcomputer 15. In addition, the above Equations (9) and (10) are stored in a portion of the microcomputer 15.

In addition, in the above four-wheel steering system, a desired steering quantity determining unit which determines a desired steering quantity relating to the rear wheels 4 in accordance with an estimated yaw rate and an estimated lateral slip angle is stored in the microcomputer 15.

An output of the microcomputer 15 is connected to an input of an actuator drive circuit 16. An output of the actuator drive circuit 16 is connected to an input of the actuator 2. The actuator drive circuit 16 controls the actuator 2 in accordance with the desired rear-wheel steering quantity indicated by a signal output by the above desired steering quantity determining unit, so that the steering of the rear wheels 4 is controlled by the actuator 2.

The observer 17, provided in the microcomputer 15, generates an estimated yaw rate and an estimated lateral slip angle from various measured quantities including a measured yaw rate Γ from the yaw rate sensor 14, a measured front-wheel steering angle δf from the front-wheel steering angle sensor 12, a measured rear-wheel steering angle δr from the rear-wheel steering angle sensor 13, and a measured vehicle speed V from the vehicle speed sensor 11.

The desired steering quantity determining unit, provided in the microcomputer 15, determines a desired rear-wheel steering quantity in accordance with the estimated yaw rate and the estimated lateral slip angle from the observer 17. The desired steering quantity determining unit outputs a signal indicative of the desired rear-wheel steering quantity, to the actuator drive circuit 16. The actuator drive circuit 16 receives the desired rear-wheel steering quantity signal from the desired steering quantity determining unit (or from the output of the microcomputer 15), and controls the steering of the rear wheels 4 through the actuator 2 in accordance with the desired rear-wheel steering quantity signal.

In the embodiment of FIG. 2, the state quantity measuring unit 21 is constituted by the yaw rate sensor 14 which senses the yaw rate Γ of the vehicle. The controlled variable detecting unit 22 is constituted by the front-wheel steering angle sensor 12 which senses the front-wheel steering angle δf and by the rear-wheel steering angle sensor 13 which senses the rear-wheel steering angle δr.

In the embodiment of FIG. 2, the system variable detecting unit 24 is constituted by the vehicle speed sensor 11 which senses the vehicle speed V. The correcting unit 25 and the observer 23 are constituted by portions of the microcomputer 15 wherein the above Equations (9) and (10) are stored and the feedback gain K of the observer 23 is determined in accordance with the results of calculations on the above Equations (9) and (10). The above Equations (9) and (10) are the function of the system variable included in the system matrix A. The system variable in the present embodiment is the vehicle speed V.

It is a matter of course that the equations included in the correcting unit 25 are not limited to the above Equations (9) and (10). Also, the coefficients included in the above Equations (9) and (10) may be modified to other suitable values. Also, the system variable detected by the system variable detecting unit 24 is not limited to the vehicle speed V. The vehicle weight M may be detected instead of the vehicle speed V.

In the present embodiment, the correcting unit 25 corrects a pole of the observer in accordance with the relation of the pole of the system with a predetermined change of the system variable, such that the transition of the pole of the observer follows the transition of the pole of the system. The correcting unit in the present embodiment generates a corrected pole of the observer as the function of the system variable without detecting the present value of the pole of the system.

In addition, the correcting unit according to the present invention is not limited to the present embodiment. It is also possible to provide a correcting unit which detects a current value of the pole of the system and determines the pole of the observer in accordance with the detected current value of the pole of the system.

Further, the above-described embodiment of the present invention is applied to the four-wheel steering system.

However, the present invention is not limited to the above-described embodiment. The vehicle state observer system of the present invention may be suitably applied to an antilock brake system, a traction control system, or any other system.

What is claimed is:

1. A vehicle state observer system comprising:

state quantity measuring means which measures an observable quantity of state of a vehicle;

controlled variable detecting means which detects a controlled variable of the vehicle;

an observer which estimates an unobservable quantity of state of the vehicle from the observable quantity measured by said state quantity measuring means and the controlled variable detected by said controlled variable detecting means, in accordance with a system matrix including a system variable;

system variable detecting means which detects the system variable included in the system matrix; and correcting means which corrects a pole of said observer in response to the system variable detected by said system variable detecting means.

2. The vehicle state observer system according to claim 1, wherein said observer generates an estimated unobservable quantity of state of the vehicle and an estimated observable quantity of state of the vehicle from the measured observable quantity and the detected controlled variable based on a corrected pole of the observer from said correcting means.

3. The vehicle state observer system according to claim 1, wherein a transition of a pole of a vehicle model is determined by calculating an eigenvalue of the system matrix in accordance with a change of the system variable.

4. The vehicle state observer system according to claim 1, wherein said vehicle state observer system determines a feedback gain of the observer such that a transition of a corrected pole of the observer from the correcting means follows a transition of a pole of a vehicle model in accordance with a change of the system variable.

5. The vehicle state observer system according to claim 1, wherein said correcting means and said observer are provided in a microcomputer, said correcting means including a predetermined function of the system variable by which a corrected pole of the observer in accordance with a change of the system variable is defined.

6. The vehicle state observer system according to claim 1, wherein said controlled variable detecting means includes a front-wheel steering angle sensor which senses a steering angle of front wheels of the vehicle and a rear-wheel steering angle sensor which senses a steering angle of rear wheels of the vehicle.

7. The vehicle state observer system according to claim 1, wherein said state quantity measuring means includes a yaw rate sensor which senses a yaw rate of the vehicle.

8. The vehicle state observer system according to claim 1, wherein said system variable detecting means includes a vehicle speed sensor which senses a vehicle speed of the vehicle as the system variable included in the system matrix.

* * * * *